United States Patent
Nakanishi et al.

(10) Patent No.: US 7,569,320 B2
(45) Date of Patent: Aug. 4, 2009

(54) POLYESTER RESIN FOR TONER, TONER FOR DEVELOPING ELECTROSTATIC CHARGE IMAGE AND METHOD FOR FORMING IMAGE

(75) Inventors: Yasushi Nakanishi, Tokyo (JP); Hirofumi Iemura, Tokyo (JP); Akira Yamane, Tokyo (JP); Yoshinori Onose, Tokyo (JP)

(73) Assignees: Toyo Ink Mfg. Co., Ltd, Tokyo (JP); Japan U-PICA Company, Ltd., Tokyo (JP)

( * ) Notice: Subject to any disclaimer, the term of this patent is extended or adjusted under 35 U.S.C. 154(b) by 445 days.

(21) Appl. No.: 10/540,270

(22) PCT Filed: Dec. 16, 2003

(86) PCT No.: PCT/JP03/16064

§ 371 (c)(1),
(2), (4) Date: Jun. 23, 2005

(87) PCT Pub. No.: WO2004/059396

PCT Pub. Date: Jul. 15, 2004

(65) Prior Publication Data
US 2006/0084001 A1  Apr. 20, 2006

(30) Foreign Application Priority Data
Dec. 25, 2002 (JP) ............................. 2002-374941

(51) Int. Cl.
*G03G 9/087* (2006.01)

(52) U.S. Cl. .............. 430/109.4; 430/124.1; 430/123.4; 528/272

(58) Field of Classification Search ............. 430/109.4, 430/124.1, 109.2, 123.4; 528/272, 283, 296, 528/302, 307, 308.6, 366
See application file for complete search history.

(56) References Cited

U.S. PATENT DOCUMENTS 4,814,249 A     3/1989   Oseto et al.
4,868,078 A  *  9/1989   Sakai et al. ................... 430/67

(Continued)

FOREIGN PATENT DOCUMENTS
JP          48-25669          7/1973

(Continued)

Primary Examiner—Christopher RoDee
Assistant Examiner—Rachel L Burney
(74) Attorney, Agent, or Firm—McDermott Will & Emery LLP

(57) ABSTRACT

A polyester resin for toner, wherein an acid component of the polyester comprises (1) disproportionated rosin and (2) terephthalic acid and/or isophthalic acid, an alcohol component of the polyester comprises (3) glycidyl ester of tertiary fatty acid and (4) an aliphatic diol containing from 2 to 10 carbon atoms, and a cross-linking component of the polyester comprises a polycarboxylic acid having three or more carboxyl groups and/or a polyol having three or more hydroxyl groups, with the molar ratio of the acid component (1) to the acid component (2), (1)/(2), being from 0.2 to 0.6 and the molar ratio of the alcohol component (3) to the alcohol component (4), (3)/(4), being from 0.05 to 0.4. A toner for developing an electrostatic charge image contains the polyester resin for a toner (binder resin), a colorant and a charge control agent. Further, the invention also relates to an image-forming method using the toner for developing an electrostatic charge image.

8 Claims, 1 Drawing Sheet

U.S. PATENT DOCUMENTS

| | | | |
|---|---|---|---|
| 4,968,575 A | 11/1990 | Matsumura et al. | |
| 5,345,301 A | 9/1994 | Satoh et al. | |
| 5,409,764 A * | 4/1995 | Otsuki et al. | 428/221 |
| 5,563,236 A * | 10/1996 | Murata et al. | 528/295 |
| 6,447,973 B1 * | 9/2002 | Asami et al. | 430/114 |
| 2002/0085851 A1 * | 7/2002 | Murata et al. | 399/69 |

FOREIGN PATENT DOCUMENTS

| | | |
|---|---|---|
| JP | 55-42752 | 11/1980 |
| JP | 56-1952 | 1/1981 |
| JP | 57-29704 | 6/1982 |
| JP | 57-109825 | 7/1982 |
| JP | 57-119364 | 7/1982 |
| JP | 60-252360 | 12/1985 |
| JP | 62-226161 | 10/1987 |
| JP | 63-127253 | 5/1988 |
| JP | 1-155360 | 6/1989 |
| JP | 1-155362 | 6/1989 |
| JP | 1-201675 | 8/1989 |
| JP | 1-267661 | 10/1989 |
| JP | 4-70765 | 5/1992 |
| JP | 4-226487 | 8/1992 |
| JP | 4-307557 | 10/1992 |
| JP | 4-337744 | 11/1992 |
| JP | 5-94038 | 4/1993 |
| JP | 6-27728 | 2/1994 |
| JP | 6-75422 | 3/1994 |
| JP | 7-62766 | 7/1995 |
| JP | B-52-3304 | 1/1997 |
| JP | 9-278872 | 10/1997 |
| JP | 10-48868 | 2/1998 |
| JP | 10-268558 | 10/1998 |
| JP | 11-255705 | 9/1999 |
| JP | 2001-324832 | 11/2001 |
| JP | 2002-284866 | 10/2002 |

* cited by examiner

POLYESTER RESIN FOR TONER, TONER FOR DEVELOPING ELECTROSTATIC CHARGE IMAGE AND METHOD FOR FORMING IMAGE

TECHNICAL FIELD

The present invention relates to a toner for developing an electrostatic charge image in electrophotographic copiers, laser beam printers, electrostatic recording apparatuses, etc., where images are formed by electrophotography, electrostatic recording technology, etc.; a polyester resin for a toner to be used for a toner for developing the electrostatic charge image; and a method for forming an image using the electrostatic charge image-developing toner.

BACKGROUND ART

In copiers for copying an original, printers for outputting data from computers including personal computers and printers of facsimile receivers, an electrophotographic method or electrostatic recording method has conventionally been widely employed as a technique for obtaining a copied image or a recorded image. Typical examples of the copiers and printers using the electrophotographic method or the electrostatic recording method include electrophotographic copiers, laser beam printers, printers using liquid crystal array and electrostatic printers. In the electrophotographic method or the electrostatic recording method, an electrostatic latent image (electrostatic charge image) is formed by various means on an electrostatic charge image carrier such as an electrophotographic photoreceptor or an electrostatic recording body, this electrostatic latent image is developed by a developer, the resulting toner image is, if necessary, transferred to a body onto which the toner image is to be transferred, and the toner image is fixed by heating, pressing or heat-pressing or by using a solvent vapor to obtain a final toner image, whereas the toner not having been transferred but remaining on the electrostatic charge image carrier is removed by a cleaning means. A plurality of copies or recorded products can be obtained in sequence by repeating the above-mentioned steps.

As a method for developing the above-mentioned electrostatic latent image, there are known a method of using a liquid developer wherein fine toner particles are dispersed in an electrically insulating liquid (wet developing method); a method of using a powdery toner, wherein a colorant and, if necessary, a magnetic substance are dispersed in a binder resin, together with carrier particles and a method of using a magnetic toner, wherein a magnetic substance is dispersed in a binder resin, without using carrier particles (the latter two being dry developing methods). Of these methods, the dry developing method using a powdery toner or a magnetic toner has been mainly employed in recent years.

Recently, the electrophotographic copiers and laser beam printers have been made smaller in size and have been adapted to personal use and, at the same time, have been required to be higher in printing speed and spend less energy. Therefore, various improvements have been tried on these apparatuses to form highly reliable and high-quality images at a high speed and with a low energy for a long period of time through a mechanism as simple as possible. In addition to the improvements of such apparatuses, various improvements of the toner to be used upon development have also been tried.

For example, as an apparatus for fixing a toner image, there have been widely employed a heat- and pressure-applying fixing apparatus using a heating roller and a heat- and pressure-applying fixing apparatus wherein a cylindrical or long heat-resistant film, so-called fixing belt, is used, the fixing belt is placed between a heating body and a transfer sheet, the heating body and the face of transfer sheet to be developed face each other, and the transfer sheet is conveyed with applying pressure from the back side thereof by means of a pressure-applying roller to conduct fixing by applying heat and pressure. In the fixing method using these heat-fixing apparatuses, the heating roller or the fixing belt directly contacts with the toner image upon fixing, and hence heat can be conducted to the toner with a good efficiency and the toner can be molten rapidly and smoothly with a low energy. On the other hand, however, since the molten toner directly contacts with the heating roller or the fixing belt upon fixing, there is involved a problem that part of the molten toner is transferred and adheres to the surface of the heating roller or the fixing belt and, when the heating roller or the fixing belt again contacts with a body onto which the toner image is to be transferred such as paper, this transferred and adhering toner is re-transferred onto the body onto which the toner image is to be transferred or that, in the case where no such body onto which the toner image is to be transferred exists, the toner having been transferred to the heating roller or the like is transferred to the pressure-applying roller and, when a next body onto which the toner image is to be transferred passes through the fixing apparatus, the back surface of the body is stained by the toner adhering on the pressure-applying roller, that is, a problem of so-called offset phenomenon to stain the body onto which the toner image is to be transferred.

In order to prevent such offset phenomenon of toner, it has popularly been conducted to form the surface of the heating roller by a parting material such as silicone rubber or fluorine-containing resin and apply on the surface a liquid having a good parting property such as a silicone oil to cover the surface of the heating roller with a parting liquid film layer. This technique can almost completely prevent generation of the offset phenomenon. In the method, however, an application apparatus far applying the parting liquid is required and, in addition, there arises a problem that the silicone oil is evaporated by heat to stain the inside of the copier or printer. Also, to provide such application apparatus for applying the parting liquid is inconsistent with size reduction of the copier or printer. Therefore, it has been proposed that, in place of applying a parting liquid with the application apparatus, a parting substance is incorporated in the toner itself and, by heating upon fixing, the parting substance is molten to thereby feed a parting liquid from the toner and prevent the offset phenomenon. As such parting substance, JP-B-52-3304 and JP-A-60-252360 illustrate many waxes such as low molecular weight polyethylene, low molecular weight polypropylene, hydrocarbon-based wax, natural wax and modified waxes obtained by modifying them.

In addition, it has been attempted to prevent generation of the offset phenomenon by improving the characteristics of the binder resin of the electrostatic charge image-developing toner. As examples of such binder resin having excellent offset-resisting properties, there are known cross-linked polyester resins obtained by reacting an etherified diphenol, a dicarboxylic acid component and a monomer component having three or more valences to form a cross-linked structure (JP-A-1-155362), and cross-linked polyester resins obtained by reacting an etherified diphenol, and a dicarboxylic acid component including a specific dicarboxylic acid and a tri- or more-valent monomer component including trimellitic anhydride to form a cross-linked structure (JP-A-57-109825). However, all of these are not necessarily good in low temperature fixing property.

On the other hand, from the standpoint of improving the low temperature fixing property of a toner, it is effective to decrease the softening temperature (Tm) of a toner binder resin. In general, however, it is known that decreasing of Tm simultaneously causes decreasing of the glass transition temperature (Tg) of the toner and, therefore, the toner is liable to form agglomeration during storage, called "toner blocking", or cause the offset phenomenon of the toner upon fixing. This is one of the reasons why the fixing temperature cannot be decreased as desired. As a method for obtaining a satisfactory low temperature fixing property and a satisfactory anti-blocking or anti-offset property at the same time, there has been proposed a method of using a polyester-based resin showing a comparatively low fixing temperature even when Tm or Tg is high (JP-A-56-1952). However, this method fails to provide a sufficiently satisfactory low temperature fixing property and a sufficiently satisfactory anti-blocking property or anti-offset property at the same time. It is also known to use, as an alcohol component of the polyester resin, both an alkylene glycol and an etherified diphenol in combination (e.g., JP-A-1-267661, JP-A-1-155360, etc.). However, this method shows only an insufficient pulverizing property or has a low Tg, and hence the resulting toner fails to show a sufficiently satisfactory anti-blocking property. In addition to these methods, there have been made many proposals as to polyester resins for use in toner binder, such as non-linear, cross-linked polyester resin wherein the alcohol component comprises bivalent alcohol and the acid component comprises rosin, unsaturated dicarboxylic acid and other dicarboxylic acid (JP-A-4-70765), polyester resin wherein a specific alcohol component or a specific acid component is used (e.g., JP-A-6-27728, JP-A-9-278872, JP-A-10-268558, etc.), an example of using a block polymer (JP-A-2001-324832) and an example of using an amorphous polyester and a crystalline polyester in combination (JP-A-2002-84866) Thus, it has been continued to develop a resin for toner which can provide a toner simultaneously satisfying requirements for anti-offset property, low temperature fixing property, sharply melting property, anti-blocking property, charging property, pulverizing property and transparency.

As is described above, it has conventionally been attempted to produce a toner for developing an electrostatic charge image having good properties using a polyester resin as a binder resin for the toner. However, it has conventionally popularly been conducted to use bisphenol A or its derivative as an alcohol component in obtaining a polyester binder resin for a toner having good characteristic properties. In recent years, however, it has become apparent that, in view of environmental hormone use of bisphenol A is not necessary favorable. Therefore, it has been desired to develop a polyester resin for toner, which can provide a toner excellent in characteristics such as anti-offset property, low temperature fixing property, sharply melting property, anti-blocking property, charging property, pulverizing property and transparency, and can form an excellent developed image over a long period of time, as is the same with the conventional polyester resins.

Further, production cost of a toner has recently been regarded as important, and an inexpensive binder resin for toner has been demanded. However, conventional toner binders have not fully met such requirements.

Also, in view of saving resources, there has been demanded a toner for developing an electrostatic charge image which can form an image having an image density as high as with conventional toners even when a developed image has a smaller amount of toner.

With such circumstances in mind, an object of the present invention is to provide, without using bisphenol A or the derivative thereof as an alcohol component, a polyester resin for a toner which can show excellent anti-offset property in the fixing step according to the heat roller fixing system or the fixing belt system, and which provides a toner excellent in characteristics such as low temperature fixing property, sharply melting property, anti-blocking property, charging characteristics, pulverizing property and transparency and being capable of forming an excellent developed image over a long period of time.

Another object of the invention is to provide a toner for developing an electrostatic charge image, which can show excellent anti-offset property in the fixing step according to the heat roller fixing system or the fixing belt system, and which provides a toner excellent in characteristics such as low temperature fixing property, sharply melting property, anti-blocking property, charging characteristics, pulverizing property and transparency and being capable of forming an excellent developed image over a long period of time, by using as a binder resin a polyester resin produced without using bisphenol A or the derivative thereof as an alcohol component.

A further object of the invention is to provide an inexpensive polyester resin for toner, which has excellent characteristic properties as a binder resin for toner, and a toner for developing an electrostatic charge image using the polyester resin for toner as a binder resin.

Still further object of the invention is to provide a toner for developing an electrostatic charge image, which can form an image of the same density as with conventional toners even when a developed image has a smaller amount of toner.

Yet further object of the invention is to provide a method for forming an image using a heating roller or a fixing belt, whereby a good fixed image can be formed without offset.

DISCLOSURE OF THE INVENTION

The present invention relates to a polyester resin for toner, wherein an acid component of the polyester comprises (1) disproportionated rosin and (2) terephthalic acid and/or isophthalic acid, an alcohol component of the polyester comprises (3) glycidyl ester of tertiary fatty acid and (4) an aliphatic diol containing from 2 to 10 carbon atoms, and a cross-linking component of the polyester comprises a polycarboxylic acid having three or more carboxyl groups and/or a polyol having three or more hydroxyl groups, with the molar ratio of the acid component (1) to the acid component (2), (1)/(2), being from 0.2 to 0.6 and the molar ratio of the alcohol component (3) to the alcohol component (4), (3)/(4), being from 0.05 to 0.4.

Also, the invention relates to the above-mentioned polyester resin for a toner, which further contains rosin glycidyl ester as an alcohol component.

Further, the invention relates to the above-mentioned polyester resin for a toner, which has a true density of from 1.1 to 1.3 g/cm$^3$.

Still further, the invention relates to a toner for developing an electrostatic charge image, which contains at least any one of the above-mentioned polyester resins for a toner, a colorant and a charge control agent.

Still further, the invention relates to the above-mentioned toner for developing an electrostatic charge image, wherein the charge control agent is a metal salt of aromatic hydroxycarboxylic acid and the toner has a negatively charging property.

Still further, the invention relates to a method for forming an image by heat-fixing a toner for developing an electrostatic charge image in a fixing apparatus comprising a heating roller having a heater therein and a press-applying roller to be contact-pressed against the heating roller, wherein the toner for developing an electrostatic charge image is any one of the above-described toners for developing an electrostatic charge image, the temperature of the heating roller is from 160° C. to 230° C., and the width, W (mm), of the portion where the heating roller and the pressure-applying roller are pressure-contacted with each other, and the fixing speed, S (mm/sec), are in the relation of W/S≧0.015.

Still further, the invention relates to a method for forming an image by heat-fixing a toner for developing an electrostatic charge image using a fixing apparatus pressed against a pressure-applying roller via a fixing belt, wherein the toner for developing an electrostatic charge image is any one of the above-described toners for developing an electrostatic charge image, the temperature of the fixing belt in the pressure-contacted portion is from 160° C. to 230° C., and the heating width, H (mm), of the portion where the fixing belt and the pressure-applying roller are pressure-contacted with each other, and the fixing speed, S (mm/sec), are in the relation of H/S≧0.015.

DETAILED DESCRIPTION OF THE INVENTION

Figure 1:
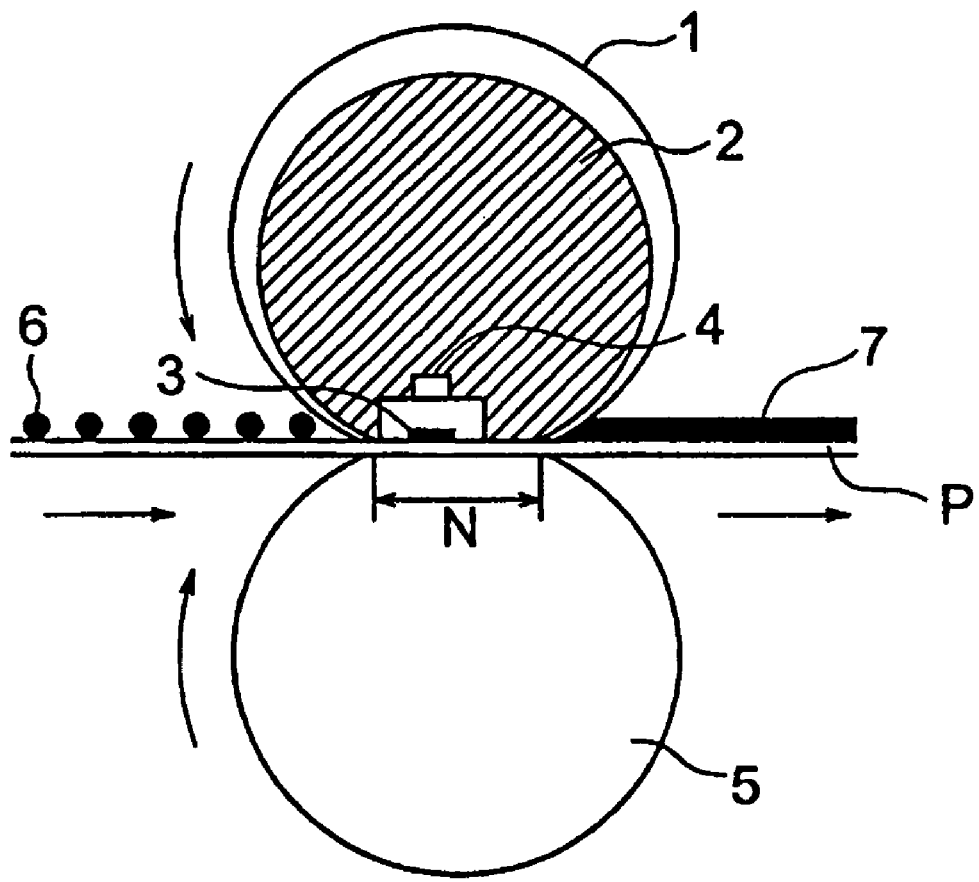
FIG. 1 is a schematic view showing one example of the fixing apparatus for use in the image-forming method of the invention.

The invention is described in more detail below. Firstly, the polyester resin of the invention for a toner comprises (a) an acid component of (1) disproportionated rosin and (2) terephthalic acid and/or isophthalic acid, (b) an alcohol component of (3) glycidyl ester of tertiary fatty acid and (4) an aliphatic diol having from 2 to 10 carbon atoms, and (c) a cross-linking component of a polycarboxylic acid having three or more carboxylic acids and/or a polyol having three or more hydroxyl groups.

In the invention, the disproportionated rosin to be used as the acid component (a) may be that which is prepared by any of conventionally known processes. As one example thereof, there is illustrated a process of reacting rosin in the presence of a disproportionation catalyst such as Pd-on-carbon catalyst for 4 hours at a temperature of 280° C. and a pressure of 10 kg/cm², and saponifying the resulting reaction product. On the other hand, the terephthalic acid and isophthalic acid to be used as the acid component (a) include terephthalic acid, isophthalic acid and the lower alkyl esters thereof. Examples of the lower alkyl ester of terephthalic acid and isophthalic acid include dimethyl terephthalate, dimethyl isophthalate, diethyl terephthalate, diethyl isophthalate, dibutyl terephthalate and dibutyl isophthalate. Of these, dimethyl terephthalate and dimethyl isophthalate are preferred in view of cost and handling. These dicarboxylic acids or the lower alkyl esters thereof may be used independently or in combination of two or more thereof. The molar ratio of (1) disproportionated rosin to (2) terephthalic acid and/or isophthalic acid, (1)/(2), is preferably from 0.2 to 0.6. In case where the molar ratio of (1) disproportionated rosin to (2) terephthalic acid and/or isophthalic acid, (1)/(2), is less than 0.2, there results a poor fixing property and, in addition, fog is liable to take place whereas, in case where the molar ratio exceeds 0.6, there results a poor anti-offset property and, in addition, image density is liable to be decreased.

In the invention, other dicarboxylic acids than terephthalic acid and isophthalic acid may be used together with terephthalic acid and isophthalic acid within the range of not spoiling the advantages of the invention. Examples of such other dicarboxylic acids include benzenedicarboxylic acids such as phthalic acid and phthalic acid anhydride; alkyldicarboxylic acids such as succinic acid, adipic acid, sebacic acid and azelaic acid; succinic acid substituted by an alkyl group having from 16 to 18 carbon atoms; unsaturated dicarboxylic acids such as fumaric acid, maleic acid, citraconic acid, itaconic acid and glutaconic acid; cyclohexanedicarboxylic acid; naphthalenedicarboxylic acid; diphenoxyethane-2,6-dicarboxylic acid; and the lower alkyl monoesters or diesters and acid anhydrides of these acids. Since these dicarboxylic acids largely influence the fixing property and the anti-blocking property of the resulting toner, they are used in proper amounts in consideration of required performances of the toner.

Examples of the glycidyl ester of tertiary fatty acid to be used in the invention as the alcohol component (b) include those which are represented by the following general formula (1):

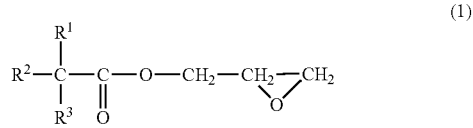

wherein $R^1$, $R^2$ and $R^3$ each represents an alkyl group.

In the above formula, the number of each of carbon atoms of $R^1$, $R^2$ and $R^3$ and the sum of the carbon atoms of these groups are not particularly limited, but glycidyl neodecanoate wherein the sum of carbon atoms of $R^1$, $R^2$ and $R^3$ is 8 is preferred.

Also, rosin glycidyl ester may also be used together with the glycidyl ester of tertiary fatty acid. Examples of the aliphatic diol containing from 2 to 10 carbon atoms include ethylene glycol, 1,2-propanediol, 1,3-propanediol, 1,2-butanediol, 1,3-butanediol, 1,4-butanediol, 2,3-butanediol, 1,4-butenediol, 2-methyl-1,3-propanediol, 1,5-pentanediol, neopentyl glycol, 2-ethyl-2-methylpropane-1,3-diol, 2-butyl-2-ethylpropane-1,3-diol, 1,6-hexanediol, 3-methyl-1,5-pentanediol, 2-ethyl-1,3-hexanediol, 2,4-dimethyl-1,5-pentanediol, 2,2,4-trimethyl-1,3-pentanediol, 1,7-heptanediol, 1,8-octanediol, 1,9-nonanediol, 1,10-decanediol, 3-hydroxy-2,2-dimethylpropyl 3-hydroxy-2,2-dimethylpropanoate, diethylene glycol, triethylene glycol and dipropylene glycol. As the aliphatic diol, neopentyl glycol is preferred from the standpoint of reactivity of the acid and the glass transition temperature of the resin. These aliphatic diols may be used independently or in combination of two or more thereof. Also, the molar ratio of (3) glycidyl ester of tertiary fatty acid to (4) an aliphatic diol containing from 2 to 10 carbon atoms, (3)/(4), is preferably from 0.05 to 0.4. In case where the molar ratio of (3) glycidyl ester of tertiary fatty acid to (4) an aliphatic diol containing from 2 to 10 carbon atoms, (3)/(4), is less than 0.05, fog is liable to occur whereas, in case where the molar ratio exceeds 0.4, there tends to result a poor anti-offset property and a poor anti-blocking property. Additionally, combined use of rosin glycidyl ester with the glycidyl ester of tertiary fatty acid serves to improve anti-offset property and anti-blocking property. The rosin glycidyl ester is used in an amount of preferably from 2 to 50 mol % in the component (b), and the glycidyl ester of tertiary fatty acid is used in an amount of preferably from 5 to 30 mol % in the component (b). Also, the molar ratio of the dicarboxylic acid (2) of the acid component to the aliphatic diol (4) of the alcohol component is preferably from 0.8 to 2.0, though it varies depending upon the molar ratio of the component (1) to the component (2) in the acid component, (1)/(2), and the molar ratio of the component (3) to the component (4) in the alcohol component, (3)/(4).

Examples of the polycarboxylic acid having 3 or more carboxyl groups to be used in the invention as the cross-linking component (c) include trimellitic acid, pyromellitic acid, 1,2,4-cyclohexanetricarboxylic acid, naphthalenetricarboxylic acid, butanetricarboxylic acid, hexanetricarboxylic acid, tetra(methylenecarboxyl)methane, octanetetracarboxylic acid, benzophenonetetracarboxylic acid and the anhydrides thereof. These may be used independently or in combination of two or more thereof. In view of reactivity, trimellitic anhydride is preferred as the polycarboxylic acid having 3 or more carboxyl groups. Examples of the polyol having 3 or more hydroxyl groups include polyhydric alcohols such as glycerol, diglycerol, sorbitol, sorbitan, butanetriol, trimethylolethane, trimethylolpropane and pentaerythritol. These may be used independently or in combination of two or more thereof. As the polyol having three or more hydroxyl groups, pentaerythritol and trimethylolpropane are preferred.

These cross-linking components function to cross-link or branch a linear polyester resin to enhance non-offset property. The amount thereof to be contained varies depending upon the ratio of (1)/(2) in the acid component (a) or the ratio of (3)/(4) in the alcohol component (b), the proportions of the acid component (a) and the alcohol component (b), the proportion of the component (2) in the acid component and the proportion of the component (4) in the alcohol component, upon whether the cross-linking component is an acid or an alcohol, and upon the number of the functional group of acid or alcohol. For example, in the case of using a tricarboxylic acid as the cross-linking agent, it is used in an amount of usually from 5 to 35 mol %, preferably from 10 to 30 mol %, based on the amount of the total acid component. In case where the amount exceeds 35 mol %, the resultant polyester resin provides a toner having a high number-average molecular weight and being liable to show a poor fixing property.

The polyester resin of the invention for a toner is prepared according to a conventionally known production process using the predetermined acid component, alcohol component and cross-linking component as starting materials. As the kind of reaction, either of ester interchange reaction and direct esterification reaction may be applicable. Also, it is possible to accelerate polycondensation by employing a process of conducting the reaction at a higher temperature under pressure, a process of conducting the reaction under reduced pressure or a process of conducting the reaction in a stream of an inert gas under an ordinary pressure. In the above-described reaction, a conventionally known reaction catalyst such as at least one metal compound selected from compounds of antimony, titanium, tin, zinc and manganese may be used to accelerate the reaction. Typical examples of the reaction catalyst include di-n-butyltin oxide, stannous oxalate, antimony trioxide, titanium tetrabutoxide, manganese acetate and zinc acetate. The addition amount of the reaction catalyst is preferably from about 0.001 to about 0.5 mol % based on the polyester resin to be obtained.

In the process for producing the polyester resin of the invention for a toner, the direct esterification process may be employed, among the above-mentioned various reactions, even under ordinary pressure. In this direct esterification process, the whole amount of the alcohol component is charged upon initiation of the reaction and, after raising the temperature to about 160° C., the acid component is charged. It is appropriate to use di-n-butyltin oxide, stannous oxalate or antimony trioxide as the reaction catalyst in an amount of from 0.01 to 0.1 mol % based on the amount of the whole acid components. In this case, a sufficient reaction rate can be obtained under ordinary pressure, but a pressure may be applied to enhance the reaction temperature. Acceleration of the reaction by the procedure of reducing the pressure is applied, for example, in the final stage of the reaction where unreacted alcohol scarcely remains and removal of generated water out of the reaction system becomes slow. Acceleration of the reaction by introducing an inert gas may be employed at any stage of the reaction in a degree of minimizing removal of the alcohol out of the system due to the introduction of the inert gas. Also, the reaction is discontinued when the softening point of the resin reached a predetermined temperature.

The polyester resin of the invention for a toner having the above-described constitution desirably has a softening point of from 115 to 150° C., preferably from 120 to 145° C., an acid value of from 10 to 60 mgKOH/g, preferably from 15 to 55 mgKOH/g, a hydroxyl value of 20 mgKOH/g or less, preferably 15 mg/KOH/g or less, and a number-average molecular weight of tetrahydrofuran (THF) solubles of from 1,000 to 6,000, preferably from 2,000 to 4,000. Because, when the softening temperature is less than 115° C., there results an extremely reduced cohesive force of the resin whereas, when it exceeds 150° C., the resin provides a toner having a reduced melt flowability and a reduced low-temperature fixing property, thus such resin not being appropriate as a binder for a toner for a high-speed copier. Also, in case where the acid value is less than 10 mgKOH/g, the resulting toner has such a small negative chargeability that the toner gives a reduced image density whereas, in case where the acid value exceeds 60 mgKOH/g, the resulting toner has such a large negative chargeability that fog is formed particularly in a low humid environment and, since hydrophilicity becomes high, there results a decreased image density particularly in a highly humid environment. Further, in the case where the hydroxyl value exceeds 20 mgKOH/g, hydrophilicity becomes so high that there results a decrease in image density particularly in a highly humid environment. As the number-average molecular weight of the polyester resin decreases, anti-offset property of the toner tends to be decreased whereas, as the number-average molecular weight of the polyester resin increases, fixing property of the toner tends to be decreased. Also, the polyester resin may be of a type having a molecular weight distribution curve with two peaks corresponding to a polycondensate component having a specific low molecular weight and a polycondensate component having a specific high molecular weight, respectively or of a type having a one-peak mono-molecular weight distribution curve. In view of preventing agglomeration of toner particles, the polyester resin of the invention for a toner has desirably a glass transition temperature (Tg), measured by a differential scanning calorimeter (DSC), of from 45 to 70° C., preferably from 50 to 65° C. Further, the true density of the resin is preferably from 1.1 to 1.3 g/cm$^3$. In the case where the true density of the resin is small, the amount of the toner required for forming an image of the same image density can be reduced, thus copying being able to be conducted with economical advantages.

The toner of the invention for developing an electrostatic charge image contains the above-mentioned polyester resin as a binder resin and, as needed, a colorant, a charge control agent, etc. As the binder resin for the toner of the invention for developing an electrostatic charge image, the above-mentioned polyester resins may be used independently or in combination of two or more thereof. Further, those resins which have conventionally been used as binder resins for a toner such as polystyrene polymers, polystyrene copolymers (e.g., styrene-acryl copolymers) and other polyester resins than the above-described polyester resins may be used together with the above-mentioned polyester resins within the range wherein the objects of the invention can be attained.

A positive or negative charge control agent may be contained, as needed, in the toner of the invention for developing an electrostatic charge image depending upon the polarity of the electrostatic latent image to be developed. Typical examples of the charge control agent which give positive charge to the toner include electron donative substances such as basic dyes (e.g., Nigrosine dyes (e.g., JP-B-48-25669) and triarylmethane dyes), quaternary ammonium salts (e.g., JP-A-57-119364), organo-tin oxides (JP-B-57-29704), and polymers having an amino group. Also, examples of the charge control agent which give negative charge to the toner include metal complexes of monoazo dyes, metal-containing dyes such as chromium-containing organic dyes (e.g., Copper Phthalocyanine Green and chromium-containing monoazo dyes), metal complexes of aryloxycarboxylic acid such as salicylic acid (e.g., JP-B-55-42752), and divalent or trivalent metal salts thereof (e.g., JP-A-11-255705 and JP-B-7-62766).

Of these charge control agents, metal salts of aromatic hydroxycarboxylic acid represented by the following general formula (2) are preferably illustrated as the negative charge control agents, with salts of metals such as calcium, chromium and iron of 3,5-di-tert-butylsalicylic acid or 3-hydroxy-2-naphthoic acid being more preferred. Since calcium salts of the aromatic hydroxycarboxylic acid are white, they are also excellent as charge control agents for color toners.

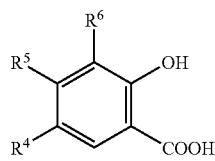

(2)

In the formula (2), $R^4$, $R^5$ and $R^6$ each represents a hydrogen atom, a saturated or unsaturated, straight or branched chain alkyl group or an aryl group which is a residue of an aromatic hydrocarbon group, or $R^4$ and $R^5$, or $R^5$ and $R^6$ are connected to each other to form a condensed ring which may have a saturated or unsaturated, straight or branched chain alkyl group.

The charge control agent may be used in an appropriate amount depending upon the kind of the charge control agent. For example, the above-described metal salt of aromatic hydroxycarboxylic acid is used in an amount of usually from 0.1 to 10 parts by weight per 100 parts by weight of the binder resin.

As the colorant to be used in the toner of the invention for developing an electrostatic charge image, any of those which are conventionally known to be used in the production of a toner may be used. Examples of the colorant include black colorants such as carbon black, aniline black, acetylene black and iron black and colorants for color copying such as various dyes and pigments (e.g., phthalocyanine series, Rhodamine series, quinacridon series, triarylmethane series, anthraquinone series, azo series, diazo series, methine series, allylamide series, thioindigo series, naphthol series, isoindolinone series, diketopyrrolopyrrole series, and benzimidazolone series dyes and pigments) and metal complex compounds or lake compounds thereof. These may be used independently or in combination of two or more thereof.

The toner of the invention for developing an electrostatic charge image can contain, as a release agent, a wax having a melt viscosity of 100 mPa·s(CS) or less at 140° C. and an acid value of 2 mgKOH/g or less in an amount of, for example, 0.5 to 10% by weight. Examples of such wax include polypropylene wax, polyethylene wax, paraffin wax, fatty acid amide wax, fatty acid ester such as carnauba wax or montan wax, partially saponified fatty acid ester wax and metal salt of fatty acid. In case where the melt viscosity of the wax at 140° C. exceeds 100 mPa·s, there arises a problem that the resulting toner shows an inferior low-temperature fixing property and, in case where the acid value of the wax exceeds 2 mgKOH/g, the wax is often contaminated with low-molecular substances which cause the problem of giving an offensive smell upon fixing or deteriorate storage stability of the resulting toner, thus such wax not being preferred.

The wax and the polyester resin for a toner are usually poor in compatibility with each other, and it is difficult to uniformly disperse the wax in the polyester resin for a toner. In order to solve this problem, a compatibility-imparting agent can be incorporated in the toner of the invention for developing an electrostatic charge image for the purpose of improving compatibility between the wax and the polyester resin for the toner. Examples of the compatibility-imparting agent include copolymers comprising ethylene unit, (meth)acrylic ester unit and glycidyl (meth)acrylate unit and/or carbon monoxide unit and containing 55% by weight or more of the ethylene unit. These compatibility-imparting agents may be used independently or two or more of the copolymers may be used in combination. For example, combination of a copolymer comprising ethylene unit, (meth)acrylic acid ester unit and glycidyl (meth)acrylate unit and a copolymer comprising ethylene unit, (meth) acrylic acid ester unit and carbon monoxide unit may be used. Additionally, the amount of polyethylene unit in the above-mentioned copolymer is more preferably from 57 to 85% by weight. Also, the amount of (meth) acrylic acid ester unit is from 5 to 44% by weight, preferably from 10 to 35% by weight, and the amount of glycidyl (meth) acrylate unit and the amount of carbon monoxide unit are from 1 to 30% by weight, preferably from 2 to 20% by weight.

Examples of the (meth) acrylic acid ester constituting the copolymer include methyl acrylate, ethyl acrylate, n-butyl acrylate, isobutyl acrylate, methyl methacrylate, isobutyl methacrylate and n-butyl methacrylate. Examples of the copolymer include ELVALOY HP771 and ELVALOY PT (Mitsui Du Pont Polychemical), and can be readily available from the market. The compatibility-imparting agent is used in an amount of preferably from 0.2 to 2 times as much as the amount of wax.

Also, the toner of the invention for developing an electrostatic charge image may contain, as needed, magnetic powder to form a magnetic toner. As the magnetic powder to be contained in the toner, any of those powders which have been conventionally used for producing magnetic toners such as alloys, oxides or compounds containing ferromagnetic elements may be used. Examples of the magnetic powders include powders of magnetic iron oxides such as magnetite, maghemite and ferrite, powders of compounds between a divalent metal and iron oxide, powders of metals such as iron, cobalt and nickel, powders of alloys between the metal and a metal such as aluminum, cobalt, copper, lead, magnesium, tin, zinc, antimony, beryllium, bismuth, cadmium, calcium, manganese, selenium, titanium, tungsten or vanadium, and a mixture of these powders. These magnetic powders have an average particle size of preferably from 0.05 to 2.0 um, more preferably from about 0.1 to about 0.5 μm. Also, the content of the magnetic powder in the toner is from about 5 to about 200 parts by weight, preferably from 10 to 150 parts by weight, per 100 parts by weight of the thermoplastic resin. Also, the saturation magnetization of the toner is preferably from 15 to 35 emu/g (magnetic field for measurement: 1 KOe) . In the toner of the invention for developing an electrostatic charge image, the magnetic powder also functions as a colorant and, in the case of using the magnetic powder, other colorant may not be used. However, carbon black, copper phthalocyanine or iron black may also be used, as needed.

To the toner of the invention for developing an electrostatic charge image may be added, internally or externally, known additives which have been used for production of a toner, as needed, such as a lubricant, a fluidity-improving agent, an abrasive, a conductivity-imparting agent and an image delamination-preventing agent. Examples of the additives include lubricants such as polyvinylidene fluoride and zinc stearate, fluidity-improving agents such as silica produced according to a dry process or a wet process, aluminum oxide, titanium oxide, silicon aluminum co-oxide, silicon titanium co-oxide, and those prepared by subjecting these to a hydrophobicity-imparting treatment, abrasives such as silicon nitride, cerium oxide, silicon carbide, strontium titanate, tungsten carbide, calcium carbonate, and those prepared by subjecting these to a hydrophobicity-imparting treatment, and conductivity-imparting agents such as carbon black and tin oxide. Fine powders of fluorine-containing polymers such as polyvinylidene fluoride are preferred in view of fluidity, abrasive property, charge stability, etc.

In the invention, it is preferred to externally add powder of silica, silicon aluminum co-oxide or silicon titanium co-oxide having been subjected to the hydrophobicity-imparting treatment. Examples of the hydrophobicity-imparting treatment of the powder include treatments using a silicone oil or a silane coupling agent such as tetramethyldisilazane, dimethyldichlorosilane, dimethyldimethoxysilane, etc. The amount of the fine powder having been subjected to the hydrophobicity-imparting treatment such as fine powder of silica having been subjected to the hydrophobicity-imparting treatment is from 0.01 to 20%, preferably from 0.03 to 5%, based on the weight of the developer.

The toner particles in the toner of the invention for developing an electrostatic charge image have a weight-average particle size of preferably from 3 to 15 μm. In particular, in view of developing performance, the toner particles more preferably contain 12 to 60% by population of toner particles of 5 μm or less in particle size, 1 to 33% by population of toner particles of 8 to 12.7 μm in particle size, and 2.0% by weight or less of toner particles of 16 μm or more in particle size and has a weight-average particle size of from 4 to 11 μm. Additionally, the particle size distribution of the toner particles can be measured using, for example, a Coulter counter.

The toner particles constituting the toner of the invention for developing an electrostatic charge image can be produced according to the conventionally known process for producing toner particles. In general, there is illustrated, as a preferred process, a process which comprises sufficiently pre-mixing the binder resin, charge control agent, colorant, and the like which constitute the toner particles in a mixer such as a dry blender, a ball mill or a Henschel mixer, well kneading the mixture using a heat kneader such as a heat roller, a kneader or a uniaxial or biaxial extruder and, after cooling to solidify the mixture, mechanically crushing the solid mixture using a crusher such as a hammer mill, finely pulverizing in a jet mill or the like, and classifying the resulting powder. The thus-classified toner particles are well mixed, if necessary, with an external additive using a mixer such as a Henschel mixer to prepare a toner of the invention for developing an electrostatic charge image.

The toner of the invention for developing an electrostatic charge image can be used as a two-component developer by mixing with carrier particles. As the carrier particles to be used together with the toner of the invention, any of conventionally known carrier particles can be used. Examples of the carrier particles to be used include magnetic powders such as iron powder, ferrite powder and nickel powder and glass beads. These carrier particles may have been subjected, as needed, to the treatment for covering the surface thereof with a resin or the like. Examples of the resin for covering the surface of the carrier particles include a styrene-acrylate copolymer, a styrene-methacrylate copolymer, an acrylate copolymer, a methacrylate copolymer, a fluorine-containing resin, a silicon-containing resin, a polyamide resin, an ionomer resin, a polyphenylene sulfide resin, and a mixture of these polymers. Of these, a fluorine-containing resin and a silicon-containing resin are particularly preferred since spent toner is formed in a less amount.

The toner of the invention for developing an electrostatic charge image can be applied to any developing method or any developing apparatus for developing an electrostatic charge image formed by the conventionally known electrophotography, electrostatic recording or electrostatic printing method. Also, the toner of the invention for developing an electrostatic charge image has such an excellent low-temperature fixing property and anti-offset property that it can favorably be used in an image-forming method employing the system of heat-fixing a toner by means of a fixing device comprising a heating roller having a heater therein and a pressure-applying roller pressure-contacted with the heating roller or the system of heat-fixing a toner by means of a fixing device wherein a heater is press-contacted with a pressure-applying roller via a fixing belt, which systems have been often employed in a small-sized electrophotographic copier or a printer utilizing the electrophotographic system. As to the preferred fixing conditions in the fixing method using the heating roller or the fixing belt, the temperature of the heating roller or the fixing belt is from 160° C. to 230° C., the width, W (mm), of the portion where the heating roller and the pressure-applying roller are press-contacted with each other and the fixing speed, S (mm/sec), satisfy the relation of $W/S \geqq 0.015$, or the heating width, H (mm), of the pressure-contacting portion between the fixing belt and the pressure-applying roller and the fixing speed, S (mm/sec), satisfy the relation of $H/S \geqq 0.015$. Also, in the image-forming method using the fixing belt, one-component type magnetic toner containing magnetic powder is preferably used as the toner for developing an electrostatic charge image.

Additionally, as a fixing device using a fixing belt, there have conventionally been known ones having various structures including those which are described in, for example, JP-A-10-48868 and JP-A-6-75422. Here, the fixing device using the fixing belt is roughly illustrated by reference to the fixing device shown in FIG. 1 and described in JP-A-10-48868. In the fixing device shown in FIG. 1, a fixing belt (diameter: 30 mm) 1 is provided around the outer periphery of a cylinder member 2 comprising a heat-resistant mold and, as a pressure-applying roller (diameter:30 mm) 5 is driven, the belt rotates due to the friction force of the pressure-applying roller. A ceramic heater 3 is provided in the fixing nip portion N (heating width H in the portion where the fixing belt and the pressure-applying roller are press-contacted with each other is the same as the width of a heater 3). The belt 1 comprises a polyimide film (50-μm thick) having formed thereon a conductive primer (10-μm thick) and a release layer of a fluorine-containing resin (10-μm thick). The pressure-applying roller 5 comprises a silicone rubber elastic layer (3-mm thick) having coated thereon a release layer of fluorine-containing resin (30-μm thick), with the pressure force being designed to be 10 kgf. The heater is 800 W in output and its on-off control is conducted by a thermistor 4 so that the temperature of the surface of the fixing belt 1 is maintained at 190° C. Non-fixed toner particles 6 remaining on the recording paper P after transfer are fixed by heat of the heater and the pressure upon passing the nip portion to form fixed toner 7.

BEST MODE FOR CARRYING OUT THE INVENTION

The invention is described in more detail by reference to Examples which, however, do not limit the invention in any way. Additionally, in the following description, "parts" means parts by weight.

The acid value, hydroxyl value, glass transition temperature (Tg), softening point and true density used in the following Examples and Comparative Examples are as defined below.

(Acid Value and Hydroxyl Value)

The acid value means the amount (mg) of potassium hydroxide necessary for neutralizing the acid group contained in 1 g of a sample. The hydroxyl value means the amount (mg) of potassium hydroxide necessary for neutralizing acetic acid bound to the hydroxyl group by acetylation of 1 g of a sample.

(Glass Transition Temperature)

The glass transition temperature means a temperature at which an extended line of a base line under Tg measured by means of a differential scanning calorimeter (DSC-50; made by Shimadzu Seisakusho) at a temperature-raising rate of 20° C./min and a tangential line of an endothermic curve in the vicinity of Tg cross.

(Softening Point)

The softening point means a temperature at h/2 wherein h is a height of S-curve in the curve of descending degree of a plunger of a flow tester vs. temperature, with the descending degree being measured on 1 g of a sample under the measuring conditions of 30 kg in load, 1 mm in nozzle diameter, 10 mm in nozzle length, 80° C. and 5 minutes in preheating temperature and period and 3° C./min in temperature-raising rate using an elevated flow tester (CFT-500D; made by Shimadzu Seisakusho).

(True Density)

The true density means a value measured according to the gas phase substitution method using a dry automatic density meter (Micromeritics Gas Pycnometer Accupyc 1330 (10 cm$^3$); manufactured by Shimadzu-Micromeritics Co.). Measuring conditions are as follows.
Measuring gas: helium
Introducing pressure: purge and run 19.5 psig (134.35 Kpag)
Balance-judging pressure: 0.0050 psig/min (0.0345 Kpag/min)
Temperature and humidity: 23° C./50%RH

EXAMPLE 1

100 Mol % of neopentyl glycol and 13 mol % of glycidyl ester of neodecanoic acid (as alcohol components for producing polyester resin) and 23 mol % of disproportionated rosin (as the starting acid component) were charged in a stainless steel-made reactor equipped with a stirrer, a heating device, a thermometer, a fractionally distilling device and a pipe for introducing a nitrogen gas. The temperature of the mixture was raised to 160° C. under stirring to melt the contents. After melting the contents, 77 mol % of terephthalic acid (as the starting acid component) and 0.03 mol % of di-n-butyltin oxide were charged therein, and the temperature of the mixture was gradually raised to 240° C. with controlling the temperature of the top of the fractionally distilling tower so as not to exceed 100° C. and removing generated water out of the system with a stream of nitrogen gas to thereby conduct esterification reaction. When the acid value reached 15 mgKOH/g, the mixture was cooled to 200° C. After cooling, 25 mol % of trimellitic anhydride was charged therein, and the temperature of the mixture was gradually raised to 240° C. in the same procedure as described above with removing generated water out of the system to thereby conduct esterification reaction. When the softening point measured by the flow tester was confirmed to reach the predetermined level, the reaction was discontinued. The characteristic properties of the thus-obtained polyester resin A are tabulated in Table 1.

Additionally, the mol % of each monomer is a mol % based on the whole acid components.

EXAMPLES 2 to 4

Polyester resins B, C and D were obtained in the same manner as in production synthesis example 1 except for changing the compounding proportions as shown in Table 1. The characteristic properties of the thus-obtained polyester resins are shown in Table 1.

EXAMPLE 5

100 Mol % of neopentyl glycol and 13 mol % of glycidyl ester of neodecanoic acid (as starting alcohol components for producing polyester resin) and 23 mol % of disproportionated rosin (as the starting acid component) were charged in a stainless steel-made reactor equipped with a stirrer, a heating device, a thermometer, a fractionally distilling device and a pipe for introducing a nitrogen gas. The temperature of the mixture was raised to 160° C. under stirring to melt the contents. After melting the contents, 47 mol % of terephthalic acid and 30 mol % of isophthalic acid (as the starting acid components) and 0.03 mol % of di-n-butyltin oxide were charged therein, and the temperature of the mixture was gradually raised to 240° C. with controlling the temperature of the top of the fractionally distilling tower so as not to exceed 100° C. and removing generated water out of the system with a stream of nitrogen gas to thereby conduct esterification reaction. When the acid value reached 15 mgKOH/g, the mixture was cooled to 200° C. After cooling, 25 mol % of trimellitic anhydride was charged therein, and the temperature of the mixture was gradually raised to 240° C. in the same procedure as described above with removing generated water out of the system to thereby conduct esterification reaction. When the softening point measured by the flow tester was confirmed to reach the predetermined level, the reaction was discontinued. The characteristic properties of the thus-obtained polyester resin E are tabulated in Table 1.

EXAMPLE 6

70 Mol % of neopentyl glycol and 8 mol % of glycidyl ester of neodecanoic acid (as starting alcohol components for producing polyester resin) and 23 mol % of disproportionated rosin (as the starting acid component) were charged in a stainless steel-made reactor equipped with a stirrer, a heating device, a thermometer, a fractionally distilling device and a pipe for introducing a nitrogen gas. The temperature of the mixture was raised to 160° C. under stirring to melt the contents. After melting the contents, 77 mol % of terephthalic acid as the starting acid component and 0.03 mol % of di-n-butyltin oxide were charged therein, and the temperature of the mixture was gradually raised to 240° C. with controlling the temperature of the top of the fractionally distilling tower so as not to exceed 100° C. and removing generated water out of the system with a stream of nitrogen gas to thereby conduct esterification reaction. When the acid value reached 30 mgKOH/g, the mixture was cooled to 160° C. After cooling, 8.5 mol % of pentaerythritol was charged therein, and the temperature of the mixture was gradually raised to 240° C. in the same procedure as described above with removing generated water out of the system to thereby conduct esterification reaction. When the softening point measured by the flow tester was confirmed to reach the predetermined level, the reaction was discontinued. The characteristic properties of the thus-obtained polyester resin F are tabulated in Table 1.

contents, 77 mol % of terephthalic acid (as the starting acid component) and 0.03 mol % of di-n-butyltin oxide were charged therein, and the temperature of the mixture was gradually raised to 240° C. with controlling the temperature of the top of the fractionally distilling tower so as not to exceed 100° C. and removing generated water out of the system with a stream of nitrogen gas to thereby conduct esterification reaction. When the acid value reached 15 mgKOH/g, the mixture was cooled to 200° C. After cooling, 25 mol % of trimellitic anhydride was charged therein, and the temperature of the mixture was gradually raised to 240° C. in the same procedure as described above with removing generated water out of the system to thereby conduct esterification reaction. When the softening point measured by the flow tester was confirmed to reach the predetermined level,

TABLE 1

|  | Example | | | | | |
|---|---|---|---|---|---|---|
|  | 1 | 2 | 3 | 4 | 5 | 6 |
|  | Polyester resin | | | | | |
|  | A | B | C | D | E | F |
| Acid component [mol %] | | | | | | |
| Disproportionated rosin (1) | 23 | 30 | 30 | 30 | 23 | 23 |
| Terephthalic acid (2) | 77 | 70 | 70 | 70 | 47 | 77 |
| Isophthalic acid (2) |  |  |  |  | 30 |  |
| Alcohol component [mol %] | | | | | | |
| Glycidyl ester of neodecanoic acid (3) | 13 | 20 | 20 | 20 | 13 | 8 |
| Neopentyl glycol (4) | 100 | 70 | 93 | 93 | 100 | 70 |
| Ethylene glycol (4) |  | 30 |  |  |  |  |
| Rosin glycidyl ester |  |  |  | 5 |  |  |
| Cross-linking component [mol %] | | | | | | |
| Trimellitic anhydride | 25 | 22.5 | 22.5 | 22.5 | 25 |  |
| Pentaerythritol |  |  |  |  |  | 8.5 |
| Characteristic value | | | | | | |
| Acid value [mgKOH/g] | 47.3 | 23.3 | 28.2 | 20.3 | 35.7 | 15.7 |
| Hydroxyl value [mgKOH/g] | 0.3 | 8.0 | 6.8 | 9.6 | 2.1 | 12.1 |
| Tg [° C.] | 60.2 | 53.6 | 50.5 | 51.7 | 52.2 | 58.9 |
| Softening temperature [° C.] | 126.1 | 130.5 | 131.5 | 131.9 | 122.1 | 135.6 |
| True density [g/cm$^3$] | 1.19 | 1.20 | 1.17 | 1.16 | 1.19 | 1.21 |
| (1)/(2) 0.2–0.6 | 0.30 | 0.43 | 0.43 | 0.43 | 0.30 | 0.30 |
| (3)/(4) 0.05–0.4 | 0.13 | 0.20 | 0.22 | 0.22 | 0.13 | 0.11 |

COMPARATIVE EXAMPLES 1 to 4

Polyester resins G, H, I and J were obtained in the same manner as in Example 1 except for changing the compounding proportions as shown in Table 2. The characteristic properties of the thus-obtained polyester resins are shown in Table 2.

COMPARATIVE EXAMPLE 5

100 Mol % of an adduct of 2 mols of ethylene oxide to bisphenol A and 13 mol % of glycidyl ester of neodecanoic acid (as starting alcohol components for producing polyester resin) and 23 mol % of disproportionated rosin (as the starting acid component) were charged in a stainless steel-made reactor equipped with a stirrer, a heating device, a thermometer, a fractionally distilling device and a pipe for introducing a nitrogen gas. The temperature of the mixture was raised to 160° C. under stirring to melt the contents. After melting the contents, 77 mol % of terephthalic acid (as the starting acid component) and 0.03 mol % of di-n-butyltin oxide were charged therein, and the temperature of the mixture was gradually raised to 240° C. with controlling the temperature of the top of the fractionally distilling tower so as not to exceed 100° C. and removing generated water out of the system with a stream of nitrogen gas to thereby conduct esterification reaction. When the acid value reached 15 mgKOH/g, the mixture was cooled to 200° C. After cooling, 25 mol % of trimellitic anhydride was charged therein, and the temperature of the mixture was gradually raised to 240° C. in the same procedure as described above with removing generated water out of the system to thereby conduct esterification reaction. When the softening point measured by the flow tester was confirmed to reach the predetermined level, the reaction was discontinued. The characteristic properties of the thus-obtained polyester resin K are tabulated in Table 2.

TABLE 2

|  | Comparative Example | | | | |
|---|---|---|---|---|---|
|  | 1 | 2 | 3 | 4 | 5 |
|  | Polyester resin | | | | |
|  | G | H | I | J | K |
| Acid component [mol %] | | | | | |
| Disproportionated rosin (1) | 50 | 10 | 20 | 30 | 23 |
| Terephthalic acid (2) | 50 | 90 | 80 | 70 | 77 |

TABLE 2-continued

| | Comparative Example | | | | |
|---|---|---|---|---|---|
| | 1 | 2 | 3 | 4 | 5 |
| | Polyester resin | | | | |
| | G | H | I | J | K |
| Alcohol component [mol %] | | | | | |
| Glycidyl ester of neodecanoic acid (3) | 5 | 13 | 40 | | 13 |
| Neopentyl glycol (4) | 115 | 100 | 90 | 100 | |
| Adduct of BPA and 2 mols of EO | | | | | 100 |
| Cross-linking component [mol %] | | | | | |
| Trimellitic anhydride | 25 | 22.5 | 25 | 25 | 25 |
| Characteristic value | | | | | |
| Acid value [mgKOH/g] | 7.1 | 70.5 | 27.8 | 67.6 | 33.5 |
| Hydroxyl value [mgKOH/g] | 33.3 | 5.6 | 18.9 | 0.1 | 0.3 |
| Tg [° C.] | 46.3 | 68.2 | 43.2 | 51.7 | 62.3 |
| Softening temperature [° C.] | 113.9 | 152.7 | 102.3 | 128.3 | 142.5 |
| True density [g/cm$^3$] | 1.15 | 1.21 | 1.09 | 1.23 | 1.32 |
| (1)/(2) 0.2-0.6 | 1.00 | 0.11 | 0.25 | 0.43 | 0.30 |
| (3)/(4) 0.05-0.4 | 0.04 | 0.13 | 0.44 | 0.00 | — |

The adduct of BPA and 2 mols of EO in the above table means an adduct of 2 mols of ethylene oxide to bisphenol A.

EXAMPLE 7

| (Component) | (Compounded Amount) |
|---|---|
| Polyester resin A | 100 parts |
| Magnetic substance (magnetite) | 84 parts |
| Charge control agent (chromium salt of aromatic hydroxycarboxylic acid) | 2 parts |
| Low molecular weight polypropylene | 3 parts |

The above-described materials were uniformly mixed, then kneaded, pulverized and classified to obtain negatively chargeable toner particles of 10.4 μm in average particle size. Then, 0.2 part of dimethyldichlorosilane-treated silica fine powder, 1.0 part of aminosilane-treated calcium carbonate and 1.0 part of silicon nitride fine particles were added to 100 parts of the toner particles, followed by mixing to obtain a negatively chargeable magnetic toner.

The electrification amount of the negatively chargeable magnetic toner was measured to evaluate chargeability, and storage stability was also evaluated. The results are shown in Table 3.

Further, the negatively chargeable magnetic toner was subjected to an actual copying test using a commercially available copying machine (iR6000; manufactured by Canon) having a fixing device of a heat-pressure roller structure to evaluate image density (the initial image density and the image density after producing 10,000 copies, fog density (the initial fog density and the fog density after producing 10,000 copies), the toner consumption, the fixing property and the anti-offset property. In this copying machine, the ratio of the width, W (mm), of the portion where the heating roller and the pressure-applying roller are press-contacted with each other to the fixing speed, S (mm/sec), i.e., W/S is 0.025. The results are shown in Table 3.

Additionally, the measurement and evaluation of the electrification amount, the test and evaluation on storage stability, the measurement of image density, the measurement of fog density, the measurement of the toner consumption, the test and evaluation of fixing property, and the test and evaluation on anti-offset property were conducted as follows.

(Measurement and Evaluation of the Electrification Amount, Q/M)

Cu—Zn ferrite carrier particles of 80 to 120 μm in average particle size and a toner sample were weighed so that the concentration of the toner became 5% by weight based on the weight of the total and, after mixing thereof in a ball mill or the like, the electrification amount of the toner was calculated by means of a blow-off electrification amount measuring apparatus. Specifically, the measurement was conducted in the following manner.

19.0 g of Cu—Zn ferrite carrier core (trade name: F-100; made by Powder Tech) and 1.0 g of a dried toner sample were weighed in a 50-cc plastic bottle and, after shaking 5 times, mixed for 30 minutes under the condition of 230 rotations (actually observed) (120 rotations in terms of the plastic bottle itself) using a ball mill (PLASSTIC PLANT MODEL SKS; manufactured by Shin'ei Koki Sangyo).

The thus-mixed sample was subjected to the measurement of the electrification amount by means of the blow-off electrification amount-measuring apparatus made by Toshiba Chemical. In this occasion, the maximum value was read with a blow pressure of 1 kgf/cm$^2$ and a measuring period of 20 seconds. The mesh used was 400 meshes. Also, the measurement was conducted in the environment of 23° C. and 50%RH.

(Test and Evaluation on Storage Stability)

40 g of a toner was tightly closed in a 200-ml, glass-made vessel and, after leaving for 24 hours in a 50° C. thermostatic chamber, blocking property of the toner was observed to evaluate. A sample which caused no agglomeration was rated O, a sample which caused readily destroyable agglomeration was rated Δ, and a sample which caused readily non-destroyable agglomeration was rated X.

(Measurement of Image Density)

Image density was measured by using a Macbeth densitometer. An image density of 1.35 or more is sufficient.

(Measurement of Fog Density)

Measurement of fog density was conducted by measuring reflectivity using a photovolt meter. The fog density of 1.5% or less is a sufficient level.

(Measurement of the Toner Consumption)

The toner consumption was represented in terms of gram of toner consumed per 1,000 copies in actually copying an original of 6% in black portion.

(Test and Evaluation on Fixing Property)

A fixed image was rubbed with an India rubber (MONO; made by Tombow Pencil), and the fixing strength was represented in terms of the value obtained by calculating according to the formula of [image density after rubbing/image density before rubbing]×100. A value of 85% or more is a good level.

(Test and Evaluation on Anti-Offset Property)

An image for fixing test was continuously copied to produce 200 copies and, after stopping for 5 minutes, 20 sheets of white paper were passed through the copier. Evaluation on anti-offset property was conducted based on the state of stain of the white papers. In the evaluation results, a sample which caused no stain of papers was rated as O, and a sample which caused stain of papers was rated as X.

EXAMPLE 8

| (Component) | (Compounded Amount) |
|---|---|
| Polyester resin B | 100 parts |
| Magnetic substance (magnetite) | 82 parts |
| Charge control agent (iron salt of aromatic hydroxycarboxylic acid) | 2.5 parts |
| Low molecular weight polypropylene | 3 parts |

The above-described materials were uniformly mixed, then kneaded, pulverized and classified to obtain negatively chargeable toner particles of 10.4 μm in average particle size. Then, 0.4 part of dimethyldimethoxysilane-treated silica fine powder, 0.5 part of aminosilane-treated calcium carbonate and 1.0 part of silicon nitride fine particles were added to 100 parts of the toner particles, followed by mixing to obtain a negatively chargeable magnetic toner.

The electrification amount of the negatively chargeable magnetic toner was measured in the same manner as in Example 7 to evaluate chargeability, and storage stability was also evaluated. The results are shown in Table 3(A).

Further, the negatively chargeable magnetic toner was subjected to an actual copying test using a commercially available copying machine (iR5000; manufactured by Canon) having a fixing device of a heat-pressure roller structure to evaluate image density (the initial image density and the image density after producing 10,000 copies), fog density (the initial fog density and the fog density after producing 10,000 copies), the toner consumption, the fixing property and the anti-offset property. In this copying machine, the ratio of the width, W (mm), of the portion where the heating roller and the pressure-applying roller are press-contacted with each other to the fixing speed, S (mm/sec), i.e., W/S is 0.027. The results are shown in Table 3(B).

EXAMPLE 9

A negatively chargeable magnetic toner was obtained in the same manner as in Example 7 except for using polyester resin C in place of polyester resin A. This negatively chargeable toner was subjected to evaluation on chargeability, storage stability, image density, fog density, toner consumption, fixing property and anti-offset property in the same manner as in Example 7. The results are shown in Tables 3(A) and 3(B).

EXAMPLE 10

| (Component) | (Compounded Amount) |
|---|---|
| Polyester resin A | 100 parts |
| Magnetic substance (magnetite) | 77 parts |
| Charge control agent (chromium salt of aromatic hydroxycarboxylic acid) | 1 parts |
| Synthetic paraffin wax | 1.5 parts |

The above-described materials were uniformly mixed, then kneaded, pulverized and classified to obtain negatively chargeable toner particles of 10.4 μm in average particle size. Then, 0.3 part of dimethyldichlorosilane-treated silica fine powder and 0.7 part of tungsten carbide fine particles were added to 100 parts of the toner particles, followed by mixing to obtain a negatively chargeable magnetic toner.

The electrification amount of the negatively chargeable magnetic toner was measured in the same manner as in Example 7 to evaluate chargeability, and storage stability was also evaluated. The results are shown in Table 3(A).

Further, the negatively chargeable magnetic toner was subjected to an actual copying test using a commercially available copying machine (GP210; manufactured by Canon) having a fixing device of a fixing belt structure to evaluate image density (the initial image density and the image density after producing 10,000 copies), fog density (the initial fog density and the fog density after producing 10,000 copies), the toner consumption, the fixing property and the anti-offset property in the same manner as in Example 7. In this copying machine, the ratio of the heating width, H (mm), of the portion where the fixing belt and the pressure-applying roller are press-contacted with each other to the fixing speed, S (mm/sec), i.e., H/S is 0.047. The results are shown in Table 3(B).

EXAMPLE 11

| (Component) | (Compounded Amount) |
|---|---|
| Polyester resin D | 100 parts |
| Magnetic substance (magnetite) | 75 parts |
| Charge control agent (calcium salt of aromatic hydroxycarboxylic acid) | 2 parts |
| Synthetic paraffin wax | 2 parts |

The above-described materials were uniformly mixed, then kneaded, pulverized and classified to obtain negatively chargeable toner particles of 10.4 μm in average particle size. Then, 0.4 part of dimethyldichlorosilane-treated silica fine powder and 0.7 part of tungsten carbide fine particles were added to 100 parts of the toner particles, followed by mixing to obtain a negatively chargeable magnetic toner.

The chargeability, storage stability, image density, fog density, toner consumption, fixing property and anti-offset property of the negatively chargeable magnetic toner were evaluated in the same manner as in Example 10. The results are shown in Tables 3(A) and 3(B).

EXAMPLE 12

| (Component) | (Compounded Amount) |
|---|---|
| Polyester resin E | 100 parts |
| Magnetic substance (magnetite) | 83 parts |
| Charge control agent (chromium salt of aromatic hydroxycarboxylic acid) | 1.5 parts |
| Synthetic paraffin wax | 2 parts |

The above-described materials were uniformly mixed, then kneaded, pulverized and classified to obtain negatively chargeable toner particles of 10.4 μm in average particle size. Then, 0.3 part of hexamethyldisilazane-treated silica fine powder and 0.5 part of tungsten carbide fine particles were added to 100 parts of the toner particles, followed by mixing to obtain a negatively chargeable magnetic toner.

The electrification amount of the negatively chargeable magnetic toner was measured in the same manner as in Example 7 to evaluate chargeability, and storage stability was also evaluated. The results are shown in Table 3(A).

Further, the negatively chargeable magnetic toner was subjected to an actual copying test using a commercially available copying machine (iR3300; manufactured by Canon) having a fixing device of a fixing belt structure to evaluate image density (the initial image density and the image density after producing 10,000 copies), fog density (the initial fog density and the fog density after producing 10,000 copies), the toner consumption, the fixing property and the anti-offset property in the same manner as in Example 7. In this copying machine, the ratio of the heating width, H (mm), of the portion where the fixing belt and the pressure-applying roller are press-contacted with each other to the fixing speed, S (mm/sec), i.e., H/S is 0.039. The results are shown in Table 3(B).

EXAMPLE 13

| (Component) | (Compounded Amount) |
|---|---|
| Polyester resin F | 100 parts |
| Colorant (carbon) | 12.5 parts |
| Charge control agent (zinc salt of aromatic hydroxycarboxylic acid) | 3 parts |
| Synthetic paraffin wax | 4.5 parts |
| Compatibility-imparting agent (ethylene/n-butyl acrylate/glycidyl methacrylate copolymer) | 4 parts |

The above-described materials were uniformly mixed, then kneaded, pulverized and classified to obtain negatively chargeable toner particles of 10.0 μm in average particle size. Then, 0.5 part of hexamethyldisilazane-treated silica fine powder and 0.2 part of dimethyldichlorosilane-treated silica fine powder were added to 100 parts of the toner particles, followed by mixing to obtain a negatively chargeable non-magnetic toner.

The electrification amount of the negatively chargeable non-magnetic toner was measured in the same manner as in Example 7 to evaluate chargeability, and storage stability was also evaluated. The results are shown in Table 3 (A).

Further, the negatively chargeable non-magnetic toner was subjected to an actual copying test using a commercially available copying machine (Imagio MF8570; manufactured by Ricoh) having a fixing device of a heat-pressure roller structure to evaluate image density (the initial image density and the image density after producing 10,000 copies), fog density (the initial fog density and the fog density after producing 10,000 copies), the toner consumption, the fixing property and the anti-offset property. As carrier particles, silicone-coated magnetite carrier particles were used, and development was conducted by using 4 parts of the non-magnetic toner per 100 parts of the carrier particles. In this copying machine, the ratio of the width, W (mm), of the portion where the heating roller and the pressure-applying roller are press-contacted with each other to the fixing speed, S (mm/sec), i.e., W/S is 0.023. The results are shown in Table 3(B).

COMPARATIVE EXAMPLE 6

A negatively chargeable magnetic toner was obtained in the same manner as in Example 7 except for using polyester resin G in place of polyester resin A used in Example 7. This negatively chargeable toner was subjected to evaluation on chargeability, storage stability, image density, fog density, toner consumption, fixing property and anti-offset property in the same manner as in Example 7. The results are shown in Tables 3(A) and 3(B).

COMPARATIVE EXAMPLE 7

A negatively chargeable magnetic toner was obtained in the same manner as in Example 9 except for using polyester resin H in place of polyester resin C used in Example 9. This negatively chargeable toner was subjected to evaluation on chargeability, storage stability, image density, fog density, toner consumption, fixing property and anti-offset property in the same manner as in Example 9. The results are shown in Tables 3(A) and 3(B).

COMPARATIVE EXAMPLE 8

A negatively chargeable magnetic toner was obtained in the same manner as in Example 9 except for using polyester resin I in place of polyester resin C used in Example 9. This negatively chargeable toner was subjected to evaluation on chargeability, storage stability, image density, fog density, toner consumption, fixing property and anti-offset property in the same manner as in Example 9. The results are shown in Tables 3(A) and 3(B).

COMPARATIVE EXAMPLE 9

A negatively chargeable magnetic toner was obtained in the same manner as in Example 10 except for using polyester resin J in place of polyester resin A used in Example 10. This negatively chargeable toner was subjected to evaluation on chargeability, storage stability, image density, fog density, toner consumption, fixing property and anti-offset property in the same manner as in Example 10. The results are shown in Tables 3(A) and 3(B).

COMPARATIVE EXAMPLE 10

A negatively chargeable magnetic toner was obtained in the same manner as in Example 7 except for using polyester resin K in place of polyester resin A used in Example 7. This negatively chargeable toner was subjected to evaluation on chargeability, storage stability, image density, fog density, toner consumption, fixing property and anti-offset property in the same manner as in Example 7. The results are shown in Table 3(A) and 3(B)

TABLE 3 (A)

| Example & Comparative Example | Polyester Resin | Electrification Amount (μC/g) | Storage Stability |
|---|---|---|---|
| Example 7 | Polyester resin A | −15.5 | ○ |
| Example 8 | Polyester resin B | −14.2 | ○ |
| Example 9 | Polyester resin C | −14.0 | ○ |
| Example 10 | Polyester resin A | −16.3 | ○ |
| Example 11 | Polyester resin D | −15.2 | ○ |
| Example 12 | Polyester resin E | −15.6 | ○ |

TABLE 3 (A)-continued

| Example & Comparative Example | Polyester Resin | Electrification Amount (μC/g) | Storage Stability |
|---|---|---|---|
| Example 13 | Polyester resin F | −30.0 | ○ |
| Comparative Example 6 | Polyester resin G | −9.2 | Δ |
| Comparative Example 7 | Polyester resin H | −20.0 | ○ |
| Comparative Example 8 | Polyester resin I | −14.5 | X |
| Comparative Example 9 | Polyester resin J | −18.7 | ○ |
| Comparative Example 10 | Polyester resin K | −15.6 | ○ |

TABLE 3 (B)

| | Actually Copying Test | | | | | | |
|---|---|---|---|---|---|---|---|
| | Image Density | | Fog Density | | | | |
| Example & Comparative Example | Initial Density | Density After Producing 10,000 Copies | Initial Fog density | Fog density After Producing 10,000 Copies | Toner consumption (g/1000 copies) | Fixing Ratio (%) | Anti-offset Property |
| Example 7 | 1.41 | 1.42 | 1.3 | 1.2 | 40 | 90 | ○ |
| Example 8 | 1.38 | 1.38 | 1.1 | 1.0 | 39 | 91 | ○ |
| Example 9 | 1.35 | 1.37 | 1.1 | 0.7 | 39 | 88 | ○ |
| Example 10 | 1.39 | 1.40 | 0.5 | 0.7 | 55 | 93 | ○ |
| Example 11 | 1.36 | 1.36 | 0.1 | 0.3 | 53 | 89 | ○ |
| Example 12 | 1.37 | 1.37 | 0.6 | 1.0 | 50 | 95 | ○ |
| Example 13 | 1.45 | 1.41 | 0.8 | 1.0 | 27 | 98 | ○ |
| Comparative Example 6 | 1.22 | 1.25 | 0.3 | 0.5 | 33 | 95 | X |
| Comparative Example 7 | 1.44 | 1.44 | 2.0 | 2.5 | 47 | 78 | ○ |
| Comparative Example 8 | 1.36 | 1.37 | 1.0 | 0.9 | 40 | 97 | X |
| Comparative Example 9 | 1.43 | 1.44 | 1.8 | 2.3 | 59 | 90 | ○ |
| Comparative Example 10 | 1.40 | 1.40 | 1.2 | 1.1 | 50 | 86 | ○ |

ADVANTAGES OF THE INVENTION

As has been described hereinbefore, the toner of the invention for developing an electrostatic charge image does not use bisphenol A or a bisphenol A derivative such as an ethylene oxide adduct of bisphenol A as an alcohol component of polyester resin used as a binder resin for the toner, and hence the toner is favorable in view of environmental hormone, and is harmless for environment.

Also, the polyester resin of the invention for a toner can provide a toner having the same characteristics as, or better characteristics than, that of the conventional toners without using bisphenol A or the derivative thereof such as anti-offset property, low-temperature fixing property, sharply melting property, anti-blocking property, charging characteristic, pulverizability and transparency. Thus, the classified product of the toner has an improved storage stability, does not suffer reduction in fluidity of the toner upon developing and does not cause blocking thereof, and can form a good developed image over a long period of time from the start of development.

Further, no offset phenomenon is observed upon fixing a toner image, which is formed by using the toner of the invention for developing an electrostatic charge image, by using a fixing roller or a fixing belt, and the toner shows a good low temperature fixing property. Therefore, it becomes possible to reduce the size of the apparatus and save energy. Further, since bisphenol A or the derivative thereof is not used in the invention, the polyester resin for a toner can be produced at a low cost. In addition, since the polyester resin of the invention for a toner has a smaller true density than the toner using bisphenol A or the derivative thereof, the amount of the toner to be used per copy can be reduced by developing with. the toner prepared by using the polyester resin, thus copying cost being reduced.

What is claimed is:

1. A polyester resin for toner, wherein an acid component of the polyester comprises (1) disproportionated rosin and (2) terephthalic acid and/or isophthalic acid, an alcohol component of the polyester comprises (3) glycidyl ester of tertiary fatty acid and (4) an aliphatic diol containing from 2 to 10 carbon atoms, and a cross-linking component of the polyester comprises a polycarboxylic acid having three or more carboxyl groups and/or a polyol having three or more hydroxyl groups, with the molar ratio of the acid component (1) to the acid component (2), (1)/(2), being from 0.2 to 0.6 and the molar ratio of the alcohol component (3) to the alcohol component (4), (3)/(4), being from 0.05 to 0.4.

2. The polyester resin for a toner according to claim 1, which further contains rosin glycidyl ester as an alcohol component.

3. The polyester resin for a toner according to claim 1, which has a true density of from 1.1 to 1.3 g/cm$^3$.

4. The polyester resin for a toner according to claim 2, which has a true density of from 1.1 to 1.3 g/cm$^3$.

5. A toner for developing an electrostatic charge image according to any one of claims 1 to 4, which comprises the above-mentioned polyester resins for a toner, a colorant and a charge control agent.

6. The toner for developing an electrostatic charge image as described in claim 5, wherein the charge control agent is a metal salt of aromatic hydroxycarboxylic acid and the toner has a negatively charging property.

7. An image-forming method by heat-fixing a toner for developing an electrostatic charge image in a fixing device comprising a heating roller having a heater therein and a pressure-applying roller to be press-contacted against the heating roller, wherein the toner for developing an electrostatic charge image is the toner described in claim 5, the temperature of the heating roller is from 160° C. to 230° C., and the width, W (mm), of the portion where the heating roller and the pressure-applying roller are pressure-contacted with each other, and the fixing speed, S (mm/sec), are in the relation of $W/S \geqq 0.015$.

8. An image-forming method by heat-fixing a toner for developing an electrostatic charge image using a fixing device pressed against a pressure-applying roller via a fixing belt, wherein the toner for developing an electrostatic charge image is the toner described in claim 5, the temperature of the fixing belt in the pressure-contacted portion is from 160° C. to 230° C., and the heating width, H (mm), of the portion where the fixing belt and the pressure-applying roller are pressure-contacted with each other, and the fixing speed, S (mm/sec), are in the relation of $H/S \geqq 0.015$.

* * * * *